United States Patent [19]

Majerski

[11] 4,215,419
[45] Jul. 29, 1980

[54] METHOD FOR BINARY MULTIPLICATION OF A NUMBER BY A SUM OF TWO NUMBERS AND A DIGITAL SYSTEM FOR IMPLEMENTATION THEREOF

[76] Inventor: Stanislaw Majerski, 43/9 Zamoyskiego Str., Warsaw, Poland

[21] Appl. No.: 969,264

[22] Filed: Dec. 14, 1978

Related U.S. Application Data

[63] Continuation of Ser. No. 802,187, May 31, 1977, abandoned.

[51] Int. Cl.² .............................................. G06F 7/52
[52] U.S. Cl. ................................................... 364/760
[58] Field of Search ................................ 364/760, 757

[56] References Cited

U.S. PATENT DOCUMENTS

| | | | |
|---|---|---|---|
| 3,691,359 | 7/1970 | Dell et al. | 364/760 X |
| 3,730,425 | 5/1973 | Kindell et al. | 364/760 |
| 3,761,698 | 9/1973 | Stephenson | 364/757 X |
| 3,840,727 | 10/1974 | Amdahl et al. | 364/760 |
| 3,919,535 | 11/1975 | Vattuone | 364/760 |
| 4,031,377 | 6/1977 | Deutsch | 364/757 |

OTHER PUBLICATIONS

Ling "High-Speed Computer Multiplicaton Using a Multiple-Bit Decoding Algorithm" IEEE Trans. on Computers, vol. C-19, No. 8 Aug. 1970, pp. 706-709.

*Primary Examiner*—David H. Malzahn
*Attorney, Agent, or Firm*—Haseltine, Lake & Waters

[57] ABSTRACT

A method and system for the implementation of binary multiplication of a number by a sum of two numbers, applicable in the computer systems, particularly in the specialized processors for numerical computations. In the method according to the invention the multiplier, as expressed by two numbers-summands represented in a binary number system, is transformed parallelly into a positional number system with digits from $-2^{g-1}$ to $+2^{g-1}$, where "g" is the number of binary positions of multiplier. These two numbers correspond to one partial product—summand of the result. The multiplying system contains registers of multiplier summands, a register of the multiplicand, a system converting the multiplier summands, the system preparing the partial products and the system summing them. Signals are generated by the converting system and represent digits from $-2^{g-1}$ to $+2^{g-1}$ depending upon signals coming from at most three positon groups of each of registers of multiplier summands and, possibly also, upon signals coming from their sign positions.

4 Claims, 5 Drawing Figures

METHOD FOR BINARY MULTIPLICATION OF A NUMBER BY A SUM OF TWO NUMBERS AND A DIGITAL SYSTEM FOR IMPLEMENTATION THEREOF

This is a continuation of application Ser. No. 802,187 filed May 31, 1977 now abandoned.

BACKGROUND OF THE INVENTION

The subject of the invention is a method of binary multiplication of a number by a sum of two numbers and a digital system for implementation thereof. The invention is applicable in digital computers and computing systems and particularly in rapid specialized processors for digital computations as well as in other rapid digital facilities performing arithmetic operations.

In the known solutions of the digital multiplying systems, rapid execution of binary multiplication of a number by a sum of two numbers-summands is realized by a rapid addition of the two summands and then a rapid multiplication of the above mentioned number by a sum of the two summands. Considerable speed of summation may be obtained in digital computers by the application of parallel adding systems provided with additional, sometimes extremely complicated, systems reducing the add carry propagation time. However, more important is a reduction of the time of multiplication since it lasts considerably longer than the summation. Binary multiplication in digital computers is usually performed by adding a sequence of partial products, which are the multiples of multiplicand shifted with respect to one another, obtained in course of multiplication of multiplicand by the component parts of multiplier, these being represented in the binary multiplication systems by bits or groups of bits of multiplier. Very great speeds of binary multiplication are obtained by summing simultaneously, in a parallel way, many partial products each of which corresponds to a group of several binary positions of the multiplier. Most rapid of the known methods of simultaneous addition of many multi-bit partial products is the method presented in the following works: C. S. Wallace's work entitled "A suggestion for a fast multiplier", "The Institute of Electrical and Electronics Engineers Transactions of Electronic Computers", volume EC-13, pages 14–17, February 1964 and T. G. Hallin's and M. J. Flynn's work entitled "Pipelining of arithmetic functions", The Institute of Electrical and Electronics Engineers Transactions of Electronic Computers, volume EC-21, pages 880–886, August 1972. Implementation of this method in the digital systems is presented in the above mentioned works in an example of a system consisting of a large number of carry save adders arranged in a tree structure with one additional carry propagating adder on the output of the adder tree, the said adder provided with systems increasing to the greatest possible extent the speed of carry propagation. The total number of partial products supplied to the inputs of this adder tree and summed in the course of multiplication may be several times smaller than the number of bits of multiplier, provided the individual partial products are multiples of the multiplicand corresponding to several-bit groups of multiplier bits.

The alternate addition and multiplication being encountered relatively frequently in digital computations requires reservation of a definite time for add-carry propagation in the course of addition. This must be realized after completion of the add carry propagation finishing the preceding multiplication. When using the described very fast multiplying system the relative time consumption for the realization of addition can be relatively large. This is a considerable drawback of the heretofore known solutions of very fast systems performing the binary multiplication of a number by a sum of two numbers.

The aim of the present invention is the elimination of this drawback as well as the complete elimination of execution of effective addition of two numbers consisting of summands of one factor of binary multiplication.

SUMMARY OF THE INVENTION

This aim is achieved by the application of the method according to the invention wherein the multiplier expressed by two numbers—summands represented in a binary number system—is transformed parallelly without performing effective addition of these summands into the redundant, positional number system having symmetrical digit range with respect to zero, and said digits determining the multiplicand factors for the individual partial products, and by the application of a system for the implementation of the method described above, including a system for a parallel conversion of the signals representing the bits of the multiplier summands into signals representing the digits of the above mentioned redundant number system for representing the multiplier.

According to the invention, the method of binary multiplication of a number by a sum of two numbers wherein partial products are summed, the said partial products being the multiples of the multiplicand shifted with relation to one another and attributed to the groups of the subsequent binary positions of multiplier with a number of positions strictly determined for each group has one characteristic feature, namely the multiplier as expressed by two numbers—summands, represented in a binary number system is converted parallelly, without realization of the effective addition of these summands, into a redundant positional representation with symmetrical digit range with respect to zero. The summands of the multiplier are most often represented in a binary complementary system or in a binary system in the form sign-magnitude. Their binary positions are partitioned identically in both the summands of multiplier into the determined position groups. Particularly advantageous is partitioning of representations of both the multiplier summands into groups of binary positions of identical number "g" of positions in the individual groups with possible slight deviations from this rule in case of indivisibility of the number of summed positions by an assumed number of binary positions within the group. It is also advantageous to assume as "g" one of integer values from 1 to 4 the best being 2 or 3. Subsequently, a group of bits representing one of the integers from the range $-2^{g-1}$ to $2^{g-1}$ determining the multiple of the multiplicand for one partial product is attributed to each pair of g-bit group of bits taken from the same groups of binary positions of both the product summands which represent one of the integers from the range from 0 to $+2^{g+1}-2$ or from $-2^g+1$ to $+2^g-1$ or, finally, from $-2^{g+1}-2$ or up to 0, depending on the kind of binary system. In particular, for multiplier summands represented in a complementary binary system and for the case of both positive multiplier summands represented in the binary sign-magnitude system, pairs of two-bit groups from 00 and 00 up to 11 and 11, which do not include the sign bits, represent the numbers from $0+0=0$ up to $3+3=6$. To each pair of 2-bit groups a group of bits representing an integer within the range from $-2$ to $+2$ is attributed. In another particular case, when both multiplier summands as expressed in the binary sign-magnitude system are negative and for three-bit groups, pairs of such groups from 111 and 111 to 000 and 000 represent numbers from $/-7/+/-7/=-14$ to $0+0=0$. To each of such pairs of the three-bit groups the group of bits representing an integer from the range from $-4$ up to $+4$ is attributed. The groups of bits representing integers from within the range from $-2^{g-1}$ up to $+2^{g-1}$ are obtained by such a simultaneous and parallel conversion of the groups of bits of both the multiplier addends that the value of the whole multiplier does not change during variations in values of the individual bit groups. The multiplier thus converted is presented in the positional base-$2^g$ number system having number of various digits $2^g+1$. It is not essential, whether the number of binary positions "g" be constant for all groups of binary positions of the multiplier or it varies for the individual groups. Parallel conversion of the bit groups of multiplier is effected in such a way that bits belonging to not more than three usually subsequent position groups of each multiplier summands are used for the determination of the bit group representing one number from within the range from $-2^{g-1}$ to $+2^{g-1}$, representing the multiplicand factor attributed to one pair of bit groups from both the multiplier summands. This refers to a case of a binary complementary representation of multiplier summands. In the case of representing these summands in the sign-magnitude system sign of multiplier addends must also be taken into account. In the next order, multiples of multiplicand representing the partial product are derived. To this aim are used either multiplicand or several previously prepared odd multiples of multiplicand and bit groups as obtained from the converted multiplier representing numbers from within the range from $-2^{g-1}$ to $+2^{g-1}$, which express the multiplicand factors. For $g=1$ and $g=2$ and the corresponding multiplicand factors $-1, 0, +1$ and $-2, -1, 0, +1, +2$ a single multiplicand is sufficient for the determination of the partial products whereas for $g=3$ and multiplicand factor from $-4$ up to $+4$ a three-fold multiplicand is necessary. For $g=4$ and multiplicand factor from $-8$ up to $+8$ the fivefold multiplicand and sevenfold multiplicand are also necessary. The even multiples of the multiplicand are obtained by shifting the odd multiples through a corresponding number of binary positions to the left and negative multiples of the multiplicand are obtained by negation of the bits of positive multiples and addition of the 1 on the least significant binary position of the negated multiple of the multiplicand. The obtained multiples of the multiplicand shifted in relation to one another, being partial products are summed, whereas it is desirable to realize a parallel summation of all partial products or at least many partial products at the same time. In result of the summation of partial products, the ultimate product of a number multiplied by a sum of two numbers is obtained.

According to the invention, during conversion of the pairs of g-bit groups of bits of both the summands of the multiplier within the groups of bits representing integers from the range from $-2^{g-1}$ to $+2^{g-1}$, the chosen bits of one or both summands of multiplier or parts thereof are negated. Negation of bits or, in other words, changing the zero bits into the one bits and the one bits into the zero bits is effected by taking advantage of the rule of replacement of the binary representation into the equivalent binary complementation of this representation. According to the formulae $$\sum_{i=0}^{n-1} a_i 2^i = 1 \cdot 2^n - \sum_{i=0}^{n-1} (1-a_i) 2^i - 1 \cdot 2^0$$

$$-\sum_{i=0}^{n-1} a_i 2^i = -1 \cdot 2^n + \sum_{i=0}^{n-1} (1-a_i) 2^i + 1 \cdot 2^0$$

the bits $a_i/i=0,1,\ldots,n-1/$ in the binary representation of the number $$\sum_{i=0}^{n-1} a_i 2^i$$

may be replaced by their negation $1-a_i$ by varying simultaneously the "weights" of these bits from the positive into negative ones and from the negative into positive ones and by supplementing the representations of these numbers by adding corrective 1's in the most and least significant positions. Independently of the negation of bits of the multiplier summands, the 1's in the chosen multiplier bit groups representing values $-1$ in the most significant positions within the given group are replaced by the equivalent pairs of 1's representing $\overline{1}1$ and analogous values $+1$ by $1\overline{1}$ in conformity with the rule $-1, 2^i = -1.2^{i+1} + 1.2^i$ and rule $+1.2^i = +1 \cdot 2^{i+1} - 1.2^i$, where the most significant 1's in the bit pairs are included into the adjacent more significant groups. Decisive for the replacement of 1's in the most significant positions within the bit groups of the multiplier summands by pairs $\overline{1}1$ and $1\overline{1}$ are values, which represent the individual bit groups of the multiplier summands, together with the most significant bits in the adjacent less significant bit groups of the multiplier summands. Both the negation of bits or bit sequences in both the multiplier summands as well as the replacement of the most significant 1's in the groups by pairs of 1's is performed in conformity with the above mentioned rules and, in consequence, does not cause a change of the value of the whole multiplier. The bits in the individual groups thus obtained wherein each bit group represents an integer from the range $-2^{g-1}$ up to $2^{g-1}$ are summed separately within each group taking into account the weights and signs represented by the individual bits. As a result, a sequence of binary encoded integers from the range from $-2^{g-1}$ up to $+2^{g-1}$ is obtained in the required convenient form. Also advantageous is such an encoding of these numbers that single 1's correspond to the individual integers from $-2^{g-1}$ up to $+2^{g-1}$ excluding zero, or, such an encoding that single 1's correspond to the modules of these numbers whereas the signs "plus" and "minus" of these numbers are encoded by two separate 1's.

In accordance with the invention, a digital system of binary multiplication of a number by a sum of two numbers for the implementation of the multiplying procedure described above has two registers containing the multiplier summands, a register containing the multiplicand, a system for conversion of the numbers supplied from registers containing the multiplier summands, a system preparing the partial products which correspond to the multiples of the multiplicand shifted with respect to one another to which the multiplicand from the multiplicand register and the converted multiplier from the above mentioned conversion system are supplied, and a system summing the multiplicand multiples shifted with respect to one another supplied from the system for preparation of partial products. The characteristic feature of the discussed system is that the system converting the multiplier summands included therein has switching networks operating parallelly and not connected directly with one another, preferably networks of identical logical structure for groups of constant number "g" of binary positions of the multiplier within the individual groups. As direct connection to be understood in this case, a connection for transmission of zero-one signals generated in one switching network directly to the other network. Each of the switching networks of the converting system has inputs connected with outputs of not more than three usually subsequent groups of binary positions of each of two registers containing the multiplier summands and, possibly, with the sign positions of these registers, this being encountered, for example, in case of binary representations in the sign-magnitude form. Each of these switching networks converts signals representing bits belonging to not more than three, usually subsequent, binary positions of each of multiplier summands and, possibly, the sign bits of the multiplier summands. As a result of this conversion, on the outputs of each of these network signals representing an integer from the interval from $-2^{g-1}$ to $+2^{g-1}$ are obtained, determining the multiplicand factor for one partial product. It is also advantageous to apply the switching networks of logical structure ensuring the obtaining of such zero-one output signals, that only one "one" signal on the other network output corresponds to each non-zero integer from the interval $-2^{g-1}$ to $+2^{g-1}$ or that one "one" signal on some other network output corresponds to each absolute integer number from the given interval and, finally, that one "one" signal on the respective network output corresponds to each of the "plus" and "minus" signs.

Modification of the system according to the invention is characterized in that the system for converting the multiplier summands has two or three layers which are not connected directly with one another within the same layer of switching network. The outputs of each switching network are connected with the respective outputs of the switching networks from the preceding layers and/or with the respective outputs of the registers containing the multiplier summands in such a way that the output signals of each switching network of the last layer representing the multiple of the multiplicand for one partial product are dependent upon the input signals coming from not more than three, usually subsequent, groups of binary positions of each register containing the multiplier summands and, possibly, from the output signals of the sign positions of both these registers, this being encountered, for example, in case of sign-magnitude binary representations. Application of two or three layers of switching networks in the system for converting the multiplier summands is aimed at a simplification of the logical structure of this system. The less economical solution described previously is used when shortening of working time of the converting system and reduction of the number of layers of its component logical elements is of greater importance than diminishing of the total number of these elements and reduction of the total cost of the whole unit.

The method of binary multiplication of a number by a sum of two numbers used in the digital system for the implementation thereof in accordance with the invention renders it possible to accelerate considerably the execution of addition-multiplication in very fast arithmetic units of digital computers. The basic advantage of this system is the avoidance of effective addition prior to the execution of multiplication and, consequently, saving of time for the propagation of carries in the course of this addition. This is particularly important in very fast digital systems where the propagation time of a single addition represents a considerable percent of the multiplication time or, in other words, in the systems where all partial products representing the summands of the final product, or at least a considerable amount of them are added simultaneously in a parallel way. Another considerable advantage of this method of addition-multiplication is the relatively small number of partial products summed in the course of multiplication as well as the small number of various multiples of the multiplicand necessary for the generation of these partial products. For example, when partitioning the representation of the multiplier summands into the three-bit groups, one partial product corresponds to one pair of groups of both the summands, that is-to six bits of both multiplier summands. In order to obtain such a partial product it is sufficient to store in a memory, except the multiplicand, the prepared triple multiplicand. By shifting and negating the bits of this multiplicand and triple multiplicand it is always possible to obtain nine subsequent multiples of the multiplicand as expressed by the integers $-4, -3, -2, -1, 0, +1, +2, +3$ and $+4$. Similarly, products being multiples of the multiplicand determined by the multiplicand factors $-2, -1, 0, +1, +2$ correspond to the pairs of multiplier summands, and, consequently, to the four-bit groups of the multiplier summands. These multiples may be obtained by shifting and negating the single multiplicand.

The invention will be explained in detail on a digital example, presenting the subsequent stages of binary multiplication of a number by a sum of two numbers and, particularly, the method of converting two multiplier summands in a sequence of integers from the range from $-2^{g-1}$ to $+2^{g-1}$ for two-position bit groups that is for $g=2$ and integers from $-2$ to $+2$.

BRIEF DESCRIPTION OF THE DRAWINGS

The invention will also be explained on an examplary implementation of the multiplication system as shown in the figure, where FIG. 1 displays a multiplication system in the block diagram according to the invention, FIG. 2—a part of unit D converting the multiplier summands in a block diagram according to the invention, FIG. 3—part of system D converting the multiplier summands in the block diagram in the modification according to the invention and FIGS. 4a and 4b—the logical structure of a segment of switching network $D_{2i}$ included in the converting system D.

Description of the Preferred Embodiments

Figure 1:
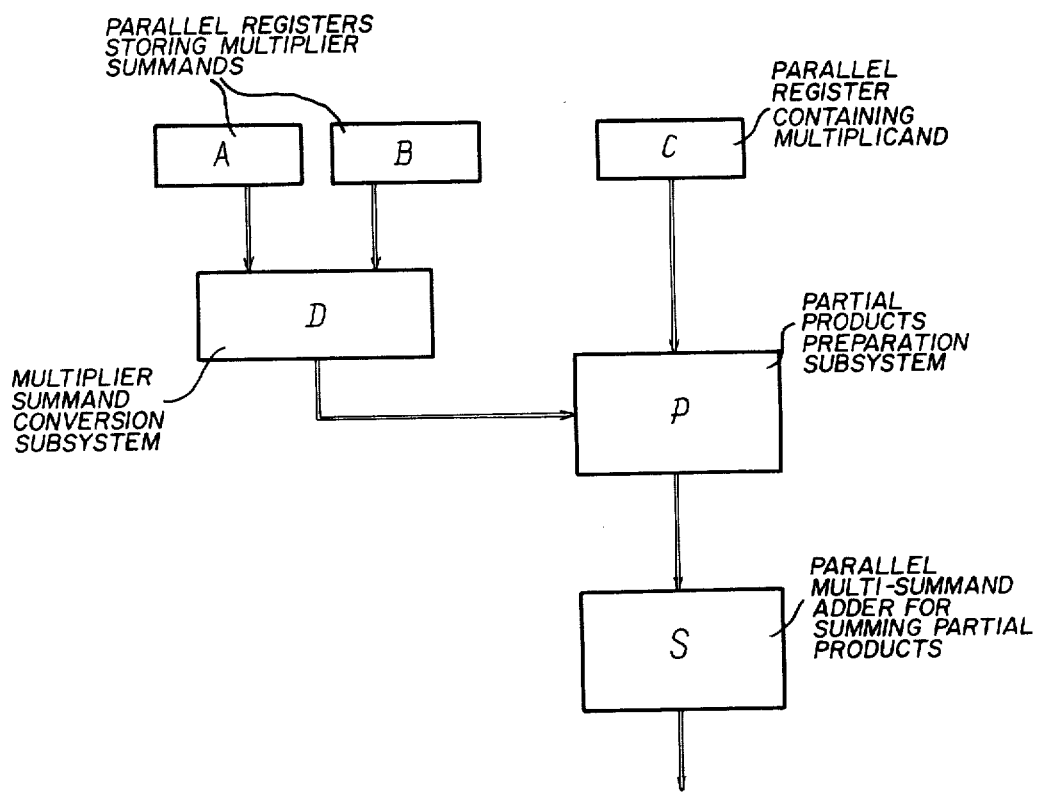

In the digital example illustrating the subsequent stages of the multiplicating method it was assumed that the multiplier is a sum of two summands "a" and "b", wherein one multiplier summand $a=+688$ and the second multiplier summand $b=-783$. These numbers are expressed in a binary complementary number system and they have the following form $$a = 0\ 1\ 0\ 1\ 0\ 1\ 1\ 0\ 0\ 0\ 0 \quad +688$$

-continued $$b = 1\ 0\ 0\ 1\ 1\ 1\ 1\ 0\ 0\ 0\ 1 \quad -783$$

Binary positions of these numbers are divided similarly in both the summands into the determined groups of identical number $g=2$ of positions in the individual groups. In consequence, we obtain the multiplier representation $$a + b = \begin{vmatrix} 0 \\ 1 \end{vmatrix} \begin{vmatrix} 1\ 0 \\ 0\ 0 \end{vmatrix} \begin{vmatrix} 1\ 0 \\ 1\ 1 \end{vmatrix} \begin{vmatrix} 1\ 1 \\ 1\ 1 \end{vmatrix} \begin{vmatrix} 0\ 0 \\ 0\ 0 \end{vmatrix} \begin{vmatrix} 0\ 0 \\ 0\ 1 \end{vmatrix}$$

where the subsequent pairs of the bit groups from both the summands represent the integers $$-1, +2, +5, +6, 0, +1$$

In the assumed number system namely in the binary complementary system, besides the pair of bits first from the left hand side representing the signs of the numbers, all the remaining groups of pairs of bits represent integers ranging within the limits from 0 to $+2^{g+1}-2$ that is for $g=2$—within the limits from 0 to 6.

The presented sequence of integers expresses the value of the multiplier in base $2^g=4$ number system, that is, in the quartary system according to the formula $$-1 \cdot 4^5 + 2 \cdot 4^4 + 5 \cdot 4^3 + 6 \cdot 4^2 + 0 \cdot 4^1 + 1 \cdot 4^0 = -95$$

which corresponds to the assumed value of multiplier $$a+b = +688 - 783 = -95$$

The pairs of bit groups should now be converted into the pairs representing the numbers from the range from $-2^{g-1} = -2$ to $+2^{g-1} = +2$, which will express the multiplicand factors. This conversion should be performed in such a way as to not change the value of the whole multiplier.

In case of a binary complementary system such conversion can embrace, for instance two operations described below. The first of these operations is the negation of the sign bit of the summand "a" and all bits of the summand "b" except the sign bit. During this negation, advantage is taken of the principle of changing the binary representation into its complementary binary representation, which requires substraction of additional 1 in the least significant position. On completion of this operation the bit groups of multiplier summands will have the following form $$a + b = \begin{vmatrix} 1 \\ 1 \end{vmatrix} \begin{vmatrix} 1\ 0 \\ 1\ 1 \end{vmatrix} \begin{vmatrix} 1\ 0 \\ 0\ 0 \end{vmatrix} \begin{vmatrix} 1\ 1 \\ 0\ 0 \end{vmatrix} \begin{vmatrix} 0\ 0 \\ 1\ 1 \end{vmatrix} \begin{vmatrix} 0\ 0 \\ 1\ 0 \end{vmatrix} \begin{matrix} + \\ - \\ 1 \end{matrix} \begin{matrix} \\ - \end{matrix}$$

where the first row of bits represents the positive values, and the second and third row—the negative values. The bit groups presented above represent now the integers $$0, -1, +2, +3, -3, -3$$

representing in the base $-4$ system the value of the multiplier $$0 \cdot 4^5 - 1 \cdot 4^4 + 2 \cdot 4^3 + 3 \cdot 4^2 - 3 \cdot 4^1 - 3 \cdot 4^0 = -95$$

The multiplier $a+b$ can be presented in more clear form by means of 0's and 1's provided with suitable signs in the form as follows:

$$a + b = \begin{vmatrix} 0 \end{vmatrix} \begin{vmatrix} - \\ 0\ 1 \end{vmatrix} \begin{vmatrix} + \\ 1\ 0 \end{vmatrix} \begin{vmatrix} +\ + \\ 1\ 1 \end{vmatrix} \begin{vmatrix} -\ - \\ 1\ 1 \end{vmatrix} \begin{vmatrix} - \\ 1\ 0 \\ - \\ 1 \end{vmatrix}$$

The second of the above mentioned operations is the replacement of the most significant 1's, representing the values $-1$ and $+1$, in some bit groups by equivalent pairs of 1's bits representing $1\bar{1}$ and $\bar{1}1$, wherein the more significant 1's are counted among the adjacent more significant groups. The more significant digits $\bar{1}$ in the group are also replaced, if the contents of the two adjacent less significant binary positions is negative. Similarly, the more significant digits $1$ in the groups are replaced, if the contents of the two adjacent less significant binary positions is positive. In the discussed example all four ancircled 1's fulfil this condition. These 1's are therefore replaced by pairs of 1's having various signs, presented below in circles $$a + b = \begin{vmatrix} 0 \end{vmatrix} \begin{vmatrix} - \\ 0\ 1 \\ + \\ 1 \end{vmatrix} \begin{vmatrix} 0 \\ - \\ 1\ 1 \end{vmatrix} \begin{vmatrix} + \\ 1 \\ - \\ 1\ 1 \end{vmatrix} \begin{vmatrix} - \\ 1 \\ + \\ 1\ 1 \end{vmatrix} \begin{vmatrix} 0 \\ + \\ 1\ 1 \end{vmatrix}$$

This leads to a variation in the value of contents of the individual groups of positions of the multiplier, namely, in each group $-2^{g-1} = -2$ to $+2^{g-1} = 2$ are obtained. The multiplier representation given above can be presented in a more comprehensive form as follows $$a+b = 0\ 0\ 0\ 0\ 1\ 1\ 0\ 0\ 0\ 0\ 1$$

where the subsequent groups represent the integers $$0, 0, -1, -2, 0, +1$$

whereas the sequence of these numbers corresponds to the value of the multiplier in the base-4 system $$0 \cdot 4^5 + 0 \cdot 4^4 - 1 \cdot 4^3 - 2 \cdot 4^2 + 0 \cdot 4^1 + 1 \cdot 4^0 = -95$$

The discussed parallel conversion of the bit groups of the multiplier summands is performed in such a way that, for the determination of the multiplicand factor attributed to the given pair of bit groups from both the multiplier summands bits were being used belonging to at least three subsequent position groups of each of the multiplier addends, this being an essential feature of the invention. Decisive for the replacement of digit $1$ by pair $1\bar{1}$ and digit $\bar{1}$ by pair $\bar{1}1$ were two preceding digits, the less significant of which the less significant one belonged to the previous less significant group and, amongst others, it decided above the more significant digit from the given pairs $1\bar{1}$ and $\bar{1}1$, which belonged to the next more significant group. The obtained numbers $$0, 0, -1, -2, 0, +1$$

are multiplicand factors used for the determination of the multiples of the multiplicand for the individual partial products. These multiples of the multiplicand are determined in such a way that multiplier and multiplicand shifted by one binary position to the left are attributed to positive numbers +1 and +2 and negation of multiplier and multiplicand shifted by one position to the left is atrributed to negative numbers −1 and −2 whereas in case of a negation of multiplicand it is always necessary to add a corrective 1 in the least significant position of multiplicand. The range of multiplicand factor from $-2^{g-1}$ to $+2^{g-1}$ including in the example under consideration, that is, for g=2 numbers −2, −1, 0, +1, +2, does not require calculation of the consecutive odd multiplicand factors as, for instance does the triple multiplicand, this being required in case of g=3 that is, for the division of the multiplier summands into the three-bit groups. Assuming multiplicand c=+1000 in the discussed example having in the binary complementary system the following form, c=0 1 1 1 1 1 0 1 0 0 0 /+1000/, we perform the following addition of three multiplicand factors corresponding to the three non zero groups of digits of multiplier a+b thus obtaining

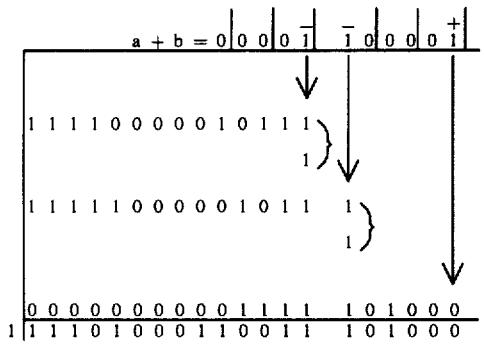

The subsequent summands in the addition presented above express: negation of multiplicand, corrective 1, negation of multiplier, corrective 1 and non-negated multiplicand. The multiplicand factors corresponding to the zero groups of multiplier bits are not written down. Arrows show the least significant digits of multiplicand factor corresponding to the individual 1's of the converted multiplier representation. The binary number thus obtained, corresponds in the complementary binary system, to the number - 95000 being the result of multiplying the multiplicand c=1100 by the sum of the multiplier summands a=+688 and b=−783.

The examplary implementation of a system of binary multiplication of a number by a sum of two numbers is shown in the figure. According to FIG. 1 the system contains two parallel registers A, B containing the multiplier summands, parallel register C containing the multiplicand, unit D converting parallelly multiplier summands supplied from the registers A, B, unit P preparing partial products being multiplicand multiples shifted in relation to each other, the said unit D being supplied parallely with the multiplicand from register C and the converted multiplier from register D as well as unit S summing parallelly simultaneously all partial products supplied from unit P. The structure of unit D converting the multiplier summands containing the switching networks, which are not directly connected with one another is shown in FIG. 2, presenting the block diagram of this unit containing the four subsequent identical switching networks $D_0$, $D_2$, $D_4$, $D_8$ attributed to the four subsequent pairs of two-position groups of binary positions of multiplier summands.

Figure 2:
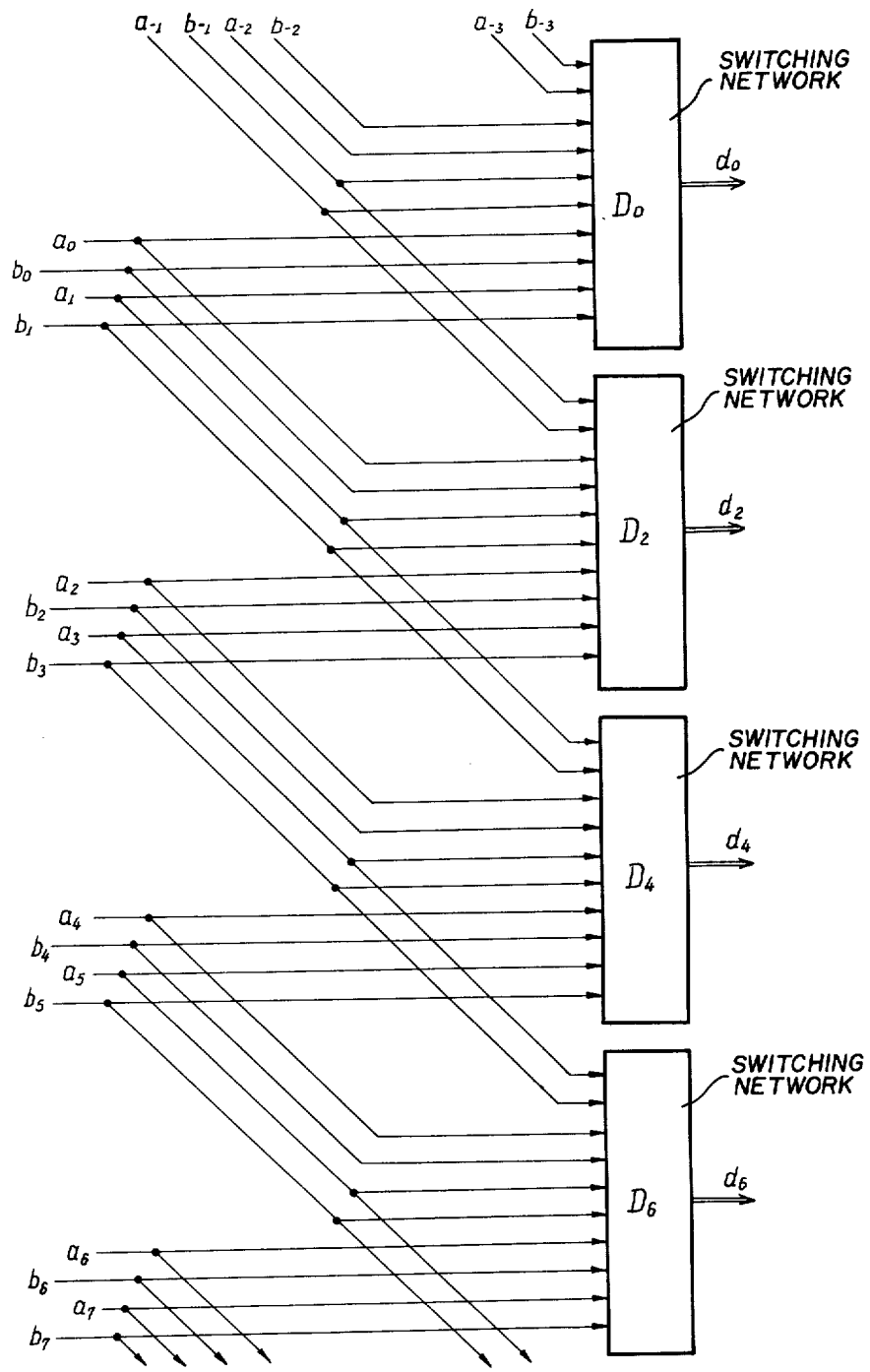
Figure 4A:
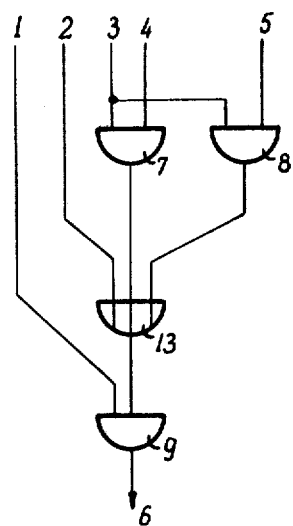
Figure 4B:
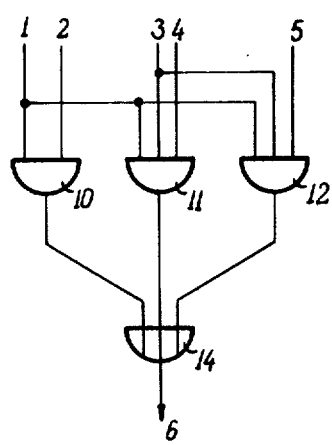

Symbols $a_0$, $b_0$, $a_1$, $b_1$, ..., $a_7$, $b_7$ in FIG. 2 denote one-bit inputs from eight subsequent binary positions of registers A, B beginning from the least significant position, and symbols $d_0$, $d_2$, $d_4$, $d_6$ denote four-bit parallel inputs of subsequent switching networks $D_0$, $D_2$, $D_4$, $D_6$. Each of the switching networks $D_{2i}$ i=0,1,2,3 has such a logical structure that as a result of zero-one signals supplied to its input from outputs $a_{2i+3}$, $b_{2i+3}$, $a_{2i-2}$, $b_{2i-2}$, ..., $a_{2i+1}$, $b_{2i+1}$ of registers A, B, designated in the figure with a common symbol $d_{2i}$ i=0,1,2,3 the zero-one signals $f_{2i}^{-1}$, $f_{2i}^{+1}$, $f_{2i}^{+2}$, appear on its four one-bit outputs such that the 1 in one of the four outputs corresponds to one of the numbers −2, −1, +1, +2. The description of the logical structure of switching network $D_{21}$ is given below in the form of Boolean equations presenting simultaneously signals $f_{2i}^{-2}$, $f_{2i}^{-1}$, $f_{2i}^{+1}$, $f_{2i}^{+2}$ as functions of output states $a_{2i-3}$, $b_{2i-3}$, $a_{2i-2}$, $b_{2i-2}$, ..., $a_{2i+1}$, $b_{2i+1}$ of registers A,B. These equations have the following form $$x_j = a_j b_j, \quad y_j = \bar{a}_j \bar{b}_j, \quad z_j = a_j \bar{b}_j \lor \bar{a}_j b_j, \quad j=0,1,2,\ldots$$

$$v_{2i} = x_{2i-1}(y_{2i-2} \lor z_{2i-2} y_{2i-3} \lor z_{2i-2} z_{2i-3})$$

$$w_{2i} = y_{2i-1}(x_{2i-2} \lor z_{2i-2} x_{2i-3} \lor z_{2i-2} z_{2i-3})$$

$$r_{2i} = v_{2i} \lor w_{2i} \lor z_{2i-1}$$

$$P_{2i} = x_{2i-1}(x_{2i-2} \lor z_{2i-2} x_{2i-3})$$

$$q_{2i} = y_{2i-1}(y_{2i-2} \lor z_{2i-2} y_{2i-3})$$

$$f_{2i}^{+2} = (x_{2i+1} \lor y_{2i+1}) z_{2i} w_{2i} \lor x_{2i+1} z_{2i} r_{2i-1} \lor$$
$$\lor z_{2i+1} x_{2i} P_{2i} \lor x_{2i+1} y_{2i} P_{2i}$$

$$f_{2i}^{-2} = (x_{2i+1} \lor y_{2i+1}) z_{2i} v_{2i-1} \lor y_{2i+1} z_{2i} r_{2i-1} \lor$$
$$\lor z_{2i+1} y_{2i} q_{2i} \lor y_{2i+1} x_{2i} q_{2i}$$

$$f_{2i}^{+1} = (x_{2i+1} \lor y_{2i+1})(Y_{2i} r_{2i} \lor z_{2i} q_{2i}) \lor$$
$$\lor z_{2i+1}(x_{2i} r_{2i} \lor z_{2i} P_{2i})$$

$$f_{2i}^{-1} = (x_{2i+1} \lor y_{2i+1})(x_{2i} r_{2i} \lor z_{2i} P_{2i}) \lor$$
$$\lor z_{2i+1}(y_{2i} r_{2i} \lor z_{2i} q_{2i})$$

where i=0,1,2,3, ... In the Boolean formulae presented above symbols $\lor$ denote logical sums, as well as the respective gates of logical sums in the structure of the switching networks. Dashes above the letters denote negations. Logical products and the respective gates of the logical products in the structure of the switching networks are presented in the formulae as common products in algebraic expressions. All bottom indices correspond to the numbers of binary positions of multiplier. For inputs $a_j$, $b_j$ with negative values of indices j, the zero state is assumed as the stationary state. Examples of logical structure of switching network generating signal $v_{2i}$, consisting of part of network $D_{2i}$ are presented in FIGS. 4a and 4b. FIG. 4a presents the structure of a network described by Boolean function $v_{2i}$ given above and FIG. 4b - the structure of a network of function $v_{2i}$ described in the same equation after "multiplying" expressions given in parantheses by $x_{2i-1}$ in this equation. Numbers from 1 to 6 denote in the figure, in turn the inputs of signals $x_{2i-1}$, $y_{2i-2}$, $z_{2i-2}$, $y_{2i-3}$, $z_{2i-3}$ and the output of signal $v_{2i}$. Numbers from 7 to 12 denote the gates of logical products and numbers 13, 14—the gates of logical sums.

Figure 3:
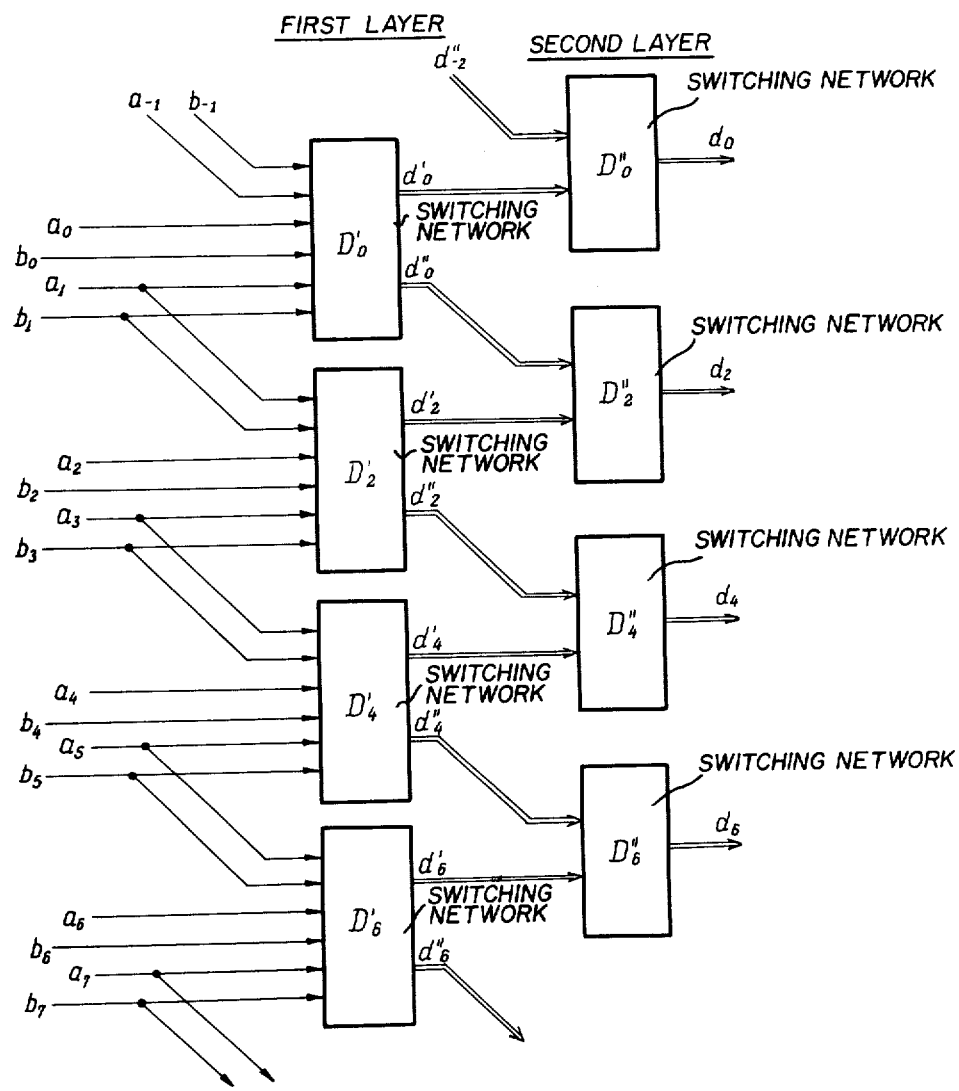

In the modification of the system according to the invention the part of system D shown in FIG. 3 contains four subsequent switching networks $D_0''$, $D_2''$, $D_4''$, $D_6''$ of the second layer of network. Such a design of the converting system has one characteristic feature, namely signals generated in each network of the first layer representing the logical functions $x_j$, $y_j$, $z_j / j = 0,1,2,3, \ldots /$ presented previously are used twice in the two adjacent networks of the first layer. In particular, each of the switching networks of the first layer $D_{2i}$ /i=0,1,2,3/ produces signals representing the values of the following eleven functions, $x_{2i}$, $y_{2i}$, $z_{2i}$, $x_{2i+1}$, $y_{2i+1}$, $z_{2i+1}$, $v_{2i+2}$, $p_{2i+2}$, $q_{2i+2}$, $r_{2i+2}$. The first six of these functions are represented by signals transmitted by the parallel six-bit connection $d_{2i}'$ to network $D_{2i}''$ belonging to the second layer whereas the last six of them including function $z_{2i+1}$ are represented by signals transmitted by a parallel six-bit connection $d_{2i}''$ to the adjacent network $D_{21}''$ of the second layer. On the four bit output $d_{2i}$ of network $D_{2i}''$ of the second layer we obtain similarly as in the previous example, signals $f_{2i}{}^{-2}$, $f_{2i}{}^{-1}$, $f_{2i}{}^{+1}$, $f_{2i}{}^{+2}$ representing numbers $-2$, $-1$, $+1$, $+2$. The logical structure of the individual switching networks of both the network layers is described by these particular logical functions given above which determine the signals being generated in these networks.

What we claim is:

1. Method of binary multiplication of a number by a sum of two numbers comprising the steps of: converting in parallel a multiplier expressed by two numbers-summands presented in binary form, without performing effective addition of said summands, into bit groups representing the integers from the range $-2^{g-1}$ to $+2^{g-1}$ said integers being the digits of the multiplier expressed in a redundant positional form with the basis $2^g$, where g is an integer from the range from 1 to 4; forming partial products being the multiplicand multiples shifted with respect to each other, said multiples being determined by the bit groups representing said integers from the range $-2^{g-1}$ to $+2^{g-1}$; adding said partial products to obtain a full product of the number by the sum of two numbers; said converting step being performed so that bits being identically grouped in both multiplier summands into g position groups are processed so that, for determining one number from the range $-2^{g-1}$ to $2^{g-1}$, use is made of bits belonging to a maximum of three position groups of each of said multiplier summands and/or using sign bits.

2. Method as defined in claim 1 including the steps of: negating bits chosen from multiplier summands and adding in 1 bit according to the rule of change of binary number form into the equivalent binary conpletmentary number form, while converting the multiplier summands into the bit groups representing integers in the range $-2^{g-1}$ to $+2^{g-1}$; and/or replacing the 1 bits representing values $-1$ in the most significant positions within chosen bit groups of the multiplier by the equivalent pairs of the 1 bits representing 1 1, and values $+1$ by 1 1, in accordance with the rule $-1.2^i = -1.2^i + 1.2^i$ and the rule $+1.2^i = +1.2^{i+1} - 1.2^i$, including the more significant 1's in said bit paris in the adjacent more significant groups.

3. Digital system for multiplication of a number of a sum of two numbers comprising: parallel registers (A,B) storing multiplier summands; parallel register (C) storing a multiplicand; subsystem (D) converting in parallel a multiplier expressed by two numbers-summands presented in binary form, without performing effective addition of said summands, into bit groups which represent the integers from the range $-2^{g-1}$ to $+2^{g-1}$, said integers being the digits of multiplier expressed in a redundant positional form with the basis $2^g$, where g is an integer in the range from 1 to 4; subsystem (P) forming partial products being the multiplicand multiples shifted with respect to each other, said multiples being determined by the bit groups representing said integers in the range $-2^{g-1}$ to $+2^{g-1}$; multi-summand adder (S) adding said partial products to obtain full product of a number by a sum of two numbers; said subsystem (D) converting the multiplier summands containing parallelly working switching networks having no direct connections with one another, each of said switching networks ($D_0$, $D_2$, $D_4$, $D_6$) having inputs connected with outputs of at most three groups of binary positions of each of two said parallel registers (A,B) storing the multiplier summands, and/or inputs connected with outputs of the sign positions of said parallel registers (A,B), each of said networks converting signals representing bits belonging to a maximum of three bit groups of each of the multiplier summands and also the sign bits of said multiplier summands if said summands are in sign magnitude form to obtain the output signals representing the integer from the range $-2^{g+1}$ to $+2^{g-1}$, said integer specifying a multiple of the multiplicand for one partial product.

4. Digital system for multiplication of a number by a sum of two numbers comprising: parallel registers (A,B) storing multiplier summands; parallel register (C) storing a multiplicand; subsystem (D) converting in parallel a multiplier expressed by two numbers-summands presented in binary form, without performing effective addition of said summands, into bit groups which represent the integers from the range $-2^{g-1}$ to $+2^{g-1}$ said integers being the digits of multiplier expressed in a redundant positional form with the basis $2^g$, where g is an integer in the range from 1 to 4; subsystem (P) forming partial products being the multiplicand multiples shifted with respect to each other, said multiples being determined by the bit groups representing said integers in the range $-2^{g-1}$ to $+2^{g-1}$; multi-summand adders (S) adding obtained partial products together to obtain full product of a number by a sum of two numbers; wherein said subsystem (D) converting the multiplier summands contains at least two layers of switching networks having no immediate connections with the range of the same layer ($D_0'$, $D_2'$, $D_4'$, $D_6'$, and $D_0''$, $D_2''$, $D_4''$, $D_6''$), inputs of each of said switching networks being connected with such outputs of the switching networks of the preceding layers or with such outputs of registers (A,B) storing the multiplier summands that the signals on outputs of each of the switching networks of last layer ($D_0''$, $D_2''$, $D_4''$, $D_6''$), which represent a number specifying the multiple of multiplicand for one partial product, are dependent exclusively on the output signals from a maximum of three groups of binary positions of each of registers (A,B) storing the multiplier summands, and/or on the output signals from the sign positions of both said registers (A,B).

* * * * *